Patented May 19, 1936

2,040,849

UNITED STATES PATENT OFFICE 2,040,849

MONOCARBOXYLIC ACID ESTERS AND THEIR PRODUCTION

Harold S. Holt, Wilmington, Del., assignor to E. I. du Pont de Nemours & Company, Wilmington, Del., a corporation of Delaware No Drawing. Application September 28, 1934, Serial No. 745,848

13 Claims. (Cl. 260—106)

This invention relates to new compositions of matter, more particularly to monocarboxylic acid esters of abietyl alcohol, to their method of preparation, and to their use in plastic and coating compositions.

This invention has as an object the provision of processes for the preparation of monocarboxylic acid esters of abietyl alcohol. A further object is the preparation of plastic and coating compositions containing such esters. A further object is the class of esters thus prepared and used. Other objects will appear hereinafter.

These objects are accomplished by the following invention wherein a monocarboxylic acid ester of abietyl alcohol is prepared and then formulated into plastic and coating compositions.

Monocarboxylic acid esters of abietyl alcohol may be prepared by reacting the monocarboxylic acid with the abietyl alcohol at a temperature sufficiently high to expel the water produced in the reaction as it is formed, or by using a catalyst with or without a solvent to aid in the removal of the water. The esters may also be prepared from the alcohol and the anhydride or acid halide of the monocarboxylic acid. A further method of preparation lies in ester interchange of the abietyl alcohol with an ester of the monocarboxylic acid with an alcohol more volatile than the abietyl alcohol. A still further method of preparation is by the reaction of the sodium or other metal salt of the monocarboxylic acid with the esters of abietyl alcohol with inorganic acids such as the hydrogen halides.

The abietyl alcohol employed in this invention is conveniently prepared by the hydrogenation, in the presence of suitable catalysts such as copper chromite, of abietic acid, its esters, salts, or anhydride, according to the general method described in copending application of W. A. Lazier (Serial No. 584,573, filed January 2, 1932) for carboxylic hydrogenation of alicyclic acids. Crude abietyl alcohol as obtained by a similar hydrogenation of ordinary rosin may also be used. The invention is not however limited to esters of abietyl alcohol obtained in this way. This alcohol, for example, may also be obtained by the sodium reduction of abietic acid esters according to the well-known general method of Bouveault and Blanc.

Having outlined above the general principles and processes of the invention, the following examples are added for purposes of illustration but not in limitation:

*Example 1.—Abietyl methacrylate*

A solution of 144 g. of abietyl alcohol (0.5 mol.) in 200 g. of chloroform was prepared, and placed in a flask fitted with a reflux condenser having the end closed with a drying tube. To this solution was added 65 g. of methacrylyl chloride (0.625 mol.) over a period of 5 minutes, heated on a water-bath for one and one-half hours, cooled, diluted with chloroform, washed with 200 cc. of 5% sodium hydroxide solution, and then washed three times with water using 500 cc. portions each time. The washed chloroform solution was dried over calcium chloride, filtered, and the filtrate vacuum distilled at room temperature, using a slow stream of carbon dioxide to sweep out the volatile material. The product obtained was a yellow, viscous liquid having a slight odor of abietyl alcohol.

*Example 2.—Abietyl ester of China-wood oil acids*

To 14 g. of China-wood oil acids (0.05 mol.) were added 13.4 g. of abietyl alcohol (0.05 mol.), and the mixture heated in an open vessel at 225° C. for one hour. The product obtained was a viscous oil of acid number 33.6.

The above ester used directly as a varnish was completely resistant to frosting (gas oven test) and showed drying properties comparable to those of a twenty-five gallon rosin-China-wood oil varnish.

*Example 3.—Abietyl acetate*

A mixture of 57.6 g. of abietyl alcohol (0.2 mol.) and 51 g. of acetic anhydride (0.5 mol.) was refluxed for two hours, after which time the product was vacuum distilled and the fraction boiling between 180° C. and 210° C. at 3 mm. pressure collected. The ester thus obtained was a light yellow, viscous oil, having a saponification number of 157.

*Example 4.—Abietyl isobutyrate*

A mixture of 57.6 g. of abietyl alcohol (0.2 mol.) and 59 g. of isobutyric anhydride (0.37 mol.) was refluxed for two hours, after which time the isobutyric acid formed in the reaction and the excess isobutyric anhydride was distilled off, the residue fractionated, and the fraction boiling between 190° and 205° C. at 3 mm. pressure collected. The ester thus formed was a light yellow, viscous oil having a saponification number of 142.5.

*Example 5.—Abietyl stearate*

A mixture of 57.6 g. of abietyl alcohol (0.2 mol.), 59.6 g. of methyl stearate (0.2 mol.), 2 g. of litharge, and 400 g. of toluol was heated to boiling in an apparatus designed to separate the methanol produced in the reaction and return the toluol to the reaction vessel. When the theoretical amount of methanol had been collected, the solution was filtered, and the toluol removed by vacuum distillation. The ester obtained was a light yellow, viscous oil.

*Example 6.—Abietyl hydroxystearate*

A mixture of 25 g. of abietyl alcohol (0.09 mol.), 25 g. of the saponification product of hydrogenated castor oil (which is mainly hydroxystearic acid), and 5 drops of concentrated sulfuric acid were heated at 150° to 175° C. for three hours at 10 to 20 mm. pressure, throughout which period of heating the reaction vessel was swept with a slow current of nitrogen. The reaction mass was then washed three times in boiling water, and the product dried. The ester thus obtained was light yellow, viscous oil having an acid number of 6.

The esters of the present invention may be made by widely different methods and the methods above described are susceptible of considerable modification. Catalysts other than p-toluenesulfonic acid may be used such as sulfuric acid, hydrochloric acid benzenesulfonic acid, and the like. Toluene may be replaced by other inert solvents such as ethylene dichloride, xylene, carbon tetrachloride, benzene, and the like. Although the use of solvents and catalysts is in general preferred, either may be used without the other. The temperature of the reaction may be varied, depending upon the process employed, on the ester and on the nature of the carboxylic acid employed.

Monocarboxylic acids in general may be used including acrylic acid, methacrylic acid, crotonic acid, levulinic acid, oleic acid, ricinoleic acid, acids obtainable from the saponification of drying, semi-drying, and non-drying oils, lactic acid, naphthenic acids, glycollic acid, butyric and isobutyric acids, hydroxycaproic acids, capric acid, chloroacetic acid, hexahydrobenzoic acid, acids obtained from the oxidation of waxes, abietic acid, palmitic acid, phenylacetic acid, benzoic acid, toluic acids, salicylic acid, cinnamic acid, phenylglycollic acid, quinic acid, benzoylactic acid, and the like.

The monocarboxylic acid esters of abietyl alcohol of the present invention such as those above described are soluble in organic solvents and either alone or in combination with drying oils, cellulose derivatives, polyhydric alcohol-polycarboxylic acid resins and other synthetic resins may be used as coating and impregnating compositions. The esters may be blended by heating, by mutual solvents, or by other means with oils including drying, semi-drying, and non-drying oils, cellulose derivatives; natural synthetic resins, e. g., rosin, kauri, vinyl resins, coumarone-indene resins, ureaaldehyde resins, phenol-aldehyde resins, polyhydric alcohol-polycarboxylic acid resins, acrylic and methacrylic acid ester polymers, natural and synthetic waxes, e. g., Montan wax, beeswax, candelilla wax, dodecyl stearate, etc. The usual pigments, dyes, fillers, solvents, as needed and desired, may be added to compositions comprising the abietyl esters of the present invention.

These new esters, either alone or combined with one or more of the above substances, find useful application as impregnating and coating agents for paper, cloth, wood, porous stone, regenerated cellulose, rubberized fabrics, etc.; as sandwiching materials or adhesives therefor in the manufacture of shatter-proof glass; as linoleum plastics in the manufacture of floor coverings; as adhesives, cements and sealing waxes for general use; and as binding agents for mica, asbestos and the like in the manufacture of insulating materials and for cotton flock in the manufacture of artificial suede, etc.

Some of the esters of the present invention, particularly those of unsaturated acids, are of great utility. Thus, the China-wood oil acid ester is unique in being practically resistant to frosting, as shown in the gas oven test, and in having drying properties comparable to those of a 25 gallon rosin-China-wood oil varnish. The abietyl ester of methacrylic acid dries slowly to a hard, clear film. Abietyl abietate is an excellent varnish gum.

The invention is also applicable to the preparation of monocarboxylic acid esters of alcohols obtained through the carboxylic reduction (catalytic or otherwise) of natural acidic resins generally, e. g., kauri, Manila, Congo, sandaric, damar, pontianac, Sierra Leone, Zanzibar, etc.

The above description and examples are intended to be illustrative only. Any modification of or variation therefrom which conforms to the spirit of the invention is intended to be included within the scope of the claims.

I claim:

1. A monocarboxylic acid ester of an alcohol obtainable by the substantially solely carboxylic reduction of a natural acidic resin.
2. A monocarboxylic acid ester of an alcohol obtainable by the substantially solely carboxylic hydrogenation of rosin.
3. A monocarboxylic acid ester of abietyl alcohol.
4. An ester of abietyl alcohol with an unsaturated monocarboxylic acid.
5. An ester of abietyl alcohol with an open chain unsaturated monocarboxylic acid.
6. Abietyl methacrylate.
7. Process for the preparation of monocarboxylic acid esters, which comprises heating an alcohol obtainable by the substantially solely carboxylic reduction of a natural acidic resin with a member of the class consisting of monocarboxylic acids, their anhydrides, acid halides, and esters with volatile alcohols.
8. Process for the preparation of esters, which comprises heating abietyl alcohol with a monocarboxylic acid.
9. Process of claim 8, wherein an inert solvent is used to assist the esterification.
10. Process of claim 8, wherein a catalyst is used to assist the esterification.
11. Process for the production of monocarboxylic acid esters, which comprises heating abietyl alcohol with monocarboxylic acid in the presence of an inert solvent and a catalyst.
12. Abietyl levulinate.
13. Abietyl acetate.

HAROLD S. HOLT.

CERTIFICATE OF CORRECTION.

Patent No. 2,040,849.  May 19, 1936.

HAROLD S. HOLT

It is hereby certified that error appears in the printed specification of the above numbered patent requiring correction as follows: Page 2, first column, line 63, after the word "natural" insert and; and that the said Letters Patent should be read with this correcton therein that the same may conform to the record of the case in the Patent Office.

Signed and sealed this 15th day of September, A. D. 1936.

(Seal)

Henry Van Arsdale
Acting Commissioner of Patents